United States Patent [19]

Tuszko et al.

[11] Patent Number: 5,071,542

[45] Date of Patent: Dec. 10, 1991

[54] ANTI-SUCTION CYCLONE SEPARATION METHOD AND APPARATUS

[76] Inventors: Wlodzimierz J. Tuszko, 5950 Terra Bella La., Camarillo, Calif. 93010; Wojciech J. Tuszko, 918 4th St., #14, Santa Monica, Calif. 90403

[21] Appl. No.: 651,033

[22] Filed: Jan. 30, 1991

Related U.S. Application Data

[63] Continuation of Ser. No. 360,117, Jun. 1, 1989, abandoned.

[51] Int. Cl.[5] .......... B01D 45/12

[52] U.S. Cl. .......... 209/144; 55/1; 55/459.1

[58] Field of Search .......... 55/459.1, 393, 395, 55/429; 209/211, 144; 210/512.1

[56] References Cited

U.S. PATENT DOCUMENTS

| | | | |
|---|---|---|---|
| 1,821,665 | 9/1931 | Prouty | 209/144 |
| 2,034,023 | 3/1936 | Cheltnam et al. | 55/459.1 |
| 2,375,826 | 5/1945 | Scott | 209/211 |
| 2,706,045 | 4/1955 | Large | 209/211 |
| 2,717,695 | 9/1955 | Martin | 209/211 |
| 2,757,581 | 8/1956 | Freeman et al. | 209/211 |
| 4,303,526 | 12/1981 | Moro et al. | 209/211 |
| 4,810,264 | 3/1989 | Dewitz | 55/393 |
| 4,872,973 | 10/1989 | Ikebuchi et al. | 209/211 |
| 4,927,298 | 5/1990 | Tuszko et al. | 209/211 |

FOREIGN PATENT DOCUMENTS

| | | | |
|---|---|---|---|
| 1442501 | 4/1970 | Fed. Rep. of Germany | 210/512.1 |
| 61633 | 7/1938 | Norway | 209/211 |
| 1286297 | 1/1987 | U.S.S.R. | 209/211 |
| 763808 | 12/1956 | United Kingdom | 209/144 |

*Primary Examiner*—Bernard Nozick

*Attorney, Agent, or Firm*—Fulwider, Patton, Lee & Utecht

[57] ABSTRACT

The anti-suction air cyclone method and apparatus insulate the most suction active part of the air core in an air core bed to prevent separated particles from being entrained from the cyclone walls into the inner vortex. Use of the air core bed increases the separation efficiency and capacity of a given cyclone dust collector.

4 Claims, 2 Drawing Sheets

ANTI-SUCTION CYCLONE SEPARATION METHOD AND APPARATUS

This application is a continuation of application Ser. No. 360,117, filed June 1, 1989, now abandoned.

FIELD OF THE INVENTION

This invention relates to a method and apparatus for centrifugally separating or collecting solid particles of foreign matter from a fluid. More specifically the invention is directed to improving separation efficiency of a cyclone dust collector, to increase its capacity, and to reduce investment and maintenance costs of such a cyclone dust collector.

BACKGROUND

An early cyclone method and apparatus is known from U.S. Pat. No. 453,105 (Bretney), issued May 26, 1891, in which there are two stages, in line, in the separating cyclone. A frequent problem with this and later cyclone devices is that efficiency of separation is markedly decreased after either capacity or feed solids concentration are increased. Later cyclone designs eliminated the small in-line second stage cyclone, but introduced only slight construction changes, not changing, however, the general principle of cyclone operation and not eliminating those disadvantages.

To avoid this phenomenon an artificial air core (AAC) was invented (U.S. Pat. No. 4,927,298 issued May 22, 1990; Ser. No. 07/334,479, Filed: Apr. 7, 1989, now abandoned) provide a high and steady separation efficiency and further to provide a three vortex cyclone.

A cyclone is a device for a creation of a vortex, and it is the vortex that does the work in separating the particulate matter from the gas. In all presently used air cyclone devices this vortex can enter the discharge dust bin to cause an excessive upflow of settled particles. To decrease a harmful effect of this suction, an anti-suction discharge valve or other similar expensive devices are required, but in spite of such devices the separation efficiency is reduced.

It is therefore one object of the present invention to provide a no-suction air cyclone separating method and apparatus for centrifugally separating or collecting solid particles from a fluid with high and stable separation efficiency.

A further object of the present invention is to eliminate the use of expensive anti-suction dust discharge devices.

Still another object of the present invention is to remarkably increase the feed capacity of every cyclone unit.

SUMMARY OF THE INVENTION

This invention relates to a device for separation of particulate fluid suspensions known as a cyclone, in which centrifugal forces of the revolving particulate suspension cause separation of the suspensions into finer and coarser or lighter and denser fractions. There are two kinds of air cyclones—pressure cyclones having a blower connected with a cyclone inlet pipe, and vacuum cyclones having a blower connected with a cyclone overflow pipe. Separation efficiency of such conventional cyclone dust collectors is considerably reduced because the separated particles are entrained by suction of the vortex air core in its lower part. To avoid this phenomenon the present invention provides for insulating the vortex air core to prevent the suction and to ensure a high and steady separation efficiency. For a pressure cyclone the presence of the air core bed makes it possible to obtain a positive air pressure in the discharge dust bin. For a vacuum cyclone, it makes it possible to greater reduce a negative air pressure in the discharge bin.

DETAILED DESCRIPTION OF THE INVENTION

Figure 1:
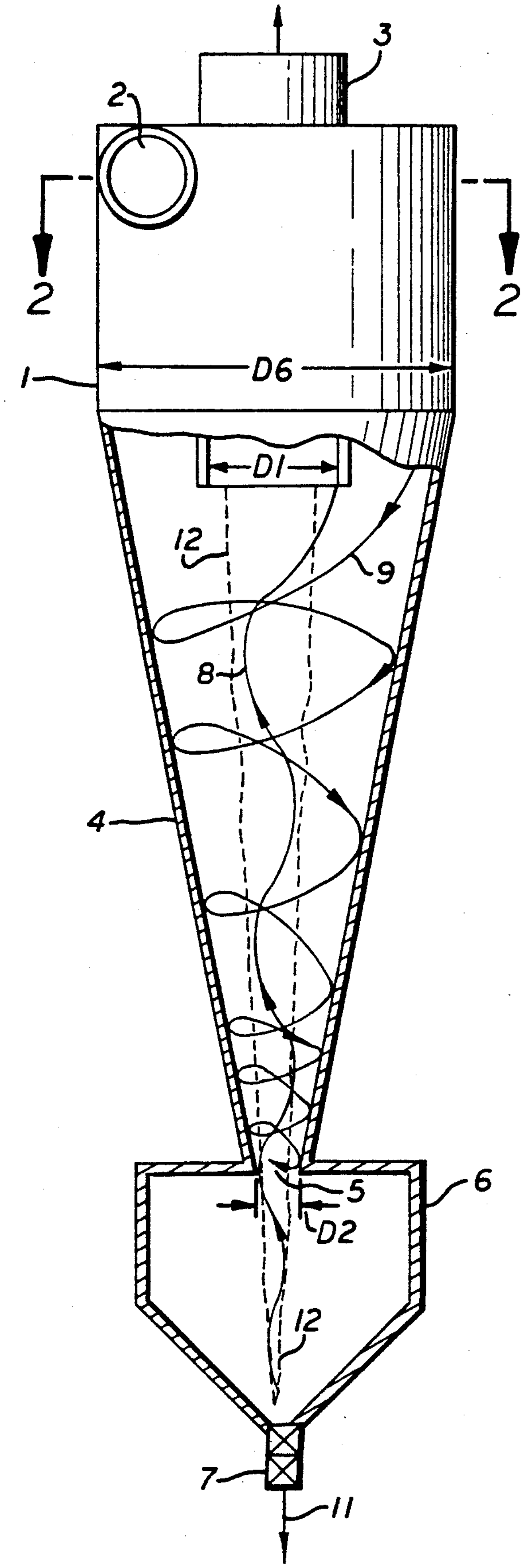
FIG. 1 is a cross-sectional elevational view of a regular cyclone dust collector.
Figure 2:
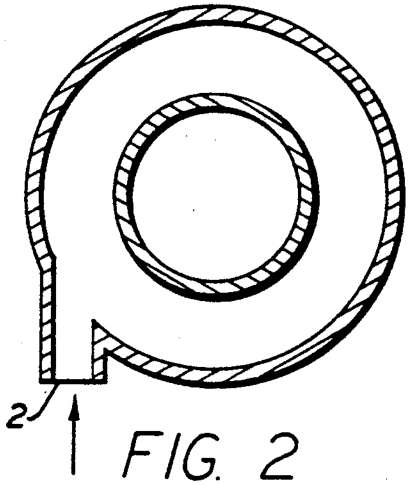
FIG. 2 is a cross-sectional view of the regular cyclone dust collector taken along line 2—2 of FIG. 1.

A regular cyclone dust collector for centrifugally separating or collecting solid particles of foreign matter from a fluid is illustrated in FIG. 1 and in FIG. 2. This cyclone is comprised of a cylindrical portion 1 having an inlet duct 2 for introduction of a feed suspension in a tangential direction. An exhaust or pipe 3 extends through the top or ceiling wall of the cylindrical portion 1. A frusto-conical portion 4 extends below the straight cylindrical portion 1. An outlet 5 for separating heavier or coarser product at the bottom of the frusto-conical portion 4 is axially aligned with the overflow exhaust pipe 3. A dust bin or hopper 6 extends below the outlet 5 of frusto-conical portion 4 and it is equipped with an anti-suction dust discharge valve 7 or another device like for example a suction blower. The dust bin 6 and valve 7 are axially aligned with the overflow exhaust pipe 3. In the portions 1 and 4 together, as in the separating chamber, the feed suspension flows in a helical swirling flow pattern so as to establish counterflowing inner 8 and outer 9 vortexes within the separating chamber, inherently causing solids in the fluid flow, which are smaller or lighter to move to the inner vortex 8 and exit through the overflow exhaust pipe 3 as a smaller or lighter product stream or overflow 10. Ingredients in the fluid flow which are coarser or heavier move to the outer vortex 9 and exit the cyclone on the walls of the cyclone through the outlet 5 as a coarser or heavier solid product stream or as an underflow 11. All of the air entering inlet duct 2, after the separating work is done, gets to inner vortex 8 to leave the cyclone through overflow exhaust pipe 3. A separation efficiency of every regular cyclone dust collector is considerably reduced because the separated particles are entrained from the cyclone walls by suction of vortex air core 12 along its lower part especially when dust discharge valve 7 is opened.

Figure 3:
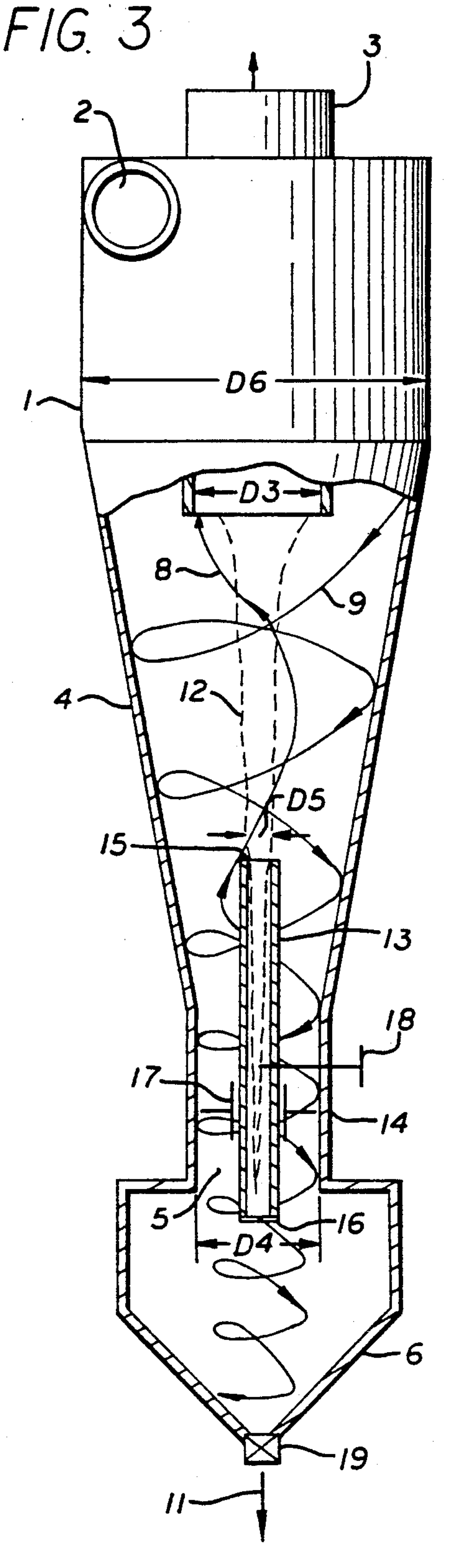
FIG. 3 is a partial sectional elevational view of a cyclone dust collector with an artificial air core bed.

The preferred no-suction air cyclone method and apparatus for separating or collecting solid particles of foreign matter from a fluid is illustrated in FIG. 3. In the invented method the lower part of cyclone air core 12 is introduced into an artificial bed or channel 13 to be insulated from neighboring revolving layers of the inner vortex 8. Then the separated solid particles, not being disturbed can get to the discharge device. Then, in the pressure cyclone, not all of the air entering inlet duct 2 can leave the cyclone through the overflow exhaust pipe 3, and a part of the air leaves the cyclone through the underflow exhaust pipe 14 to get into dust hopper 6 and to eliminate negative pressure in it. This artificial bed or channel 13 of metal, wood or plastic is opened on its top 15 to introduce the air core 12 in it and is closed on its bottom 16. The air core bed 13 extends from the cyclone separating chamber (1+4) throughout the underflow exhaust pipe 14 up to dust hopper 6. The air core bed 13 preferably can be moved up and down in a pipe bearing 17 radially attached to the walls of underflow exhaust pipe 14, that joins the bottom of frustoconical portion 4 with dust hopper 6. An electromechanical device 18 is provided for the air core bed 13 to be moved to control the amount of air leaving the cyclone through the outlet 5 and underflow exhaust pipe 14. On the bottom of the dust hopper 6 a regular dust discharge valve 19 is attached. The cross sectional area D3 of the No-Suction Air Cyclone (NSAC) overflow exhaust pipe 3 shown in FIG. 3 can be the same as D1 of a regular cyclone dust collector shown in FIG. 1. The cross sectional area D4 of NSAC cyclone of outlet 5 is smaller than the area D3 of its overflow exhaust pipe 3. The cross sectional are D4 of NSAC cyclone outlet 5 is bigger than sectional area D2 of a regular cyclone The cross sectional area D5 of air core bed 13 is smaller than the cross sectional area D4 of underflow exhaust pipe 3.

Figure 4:
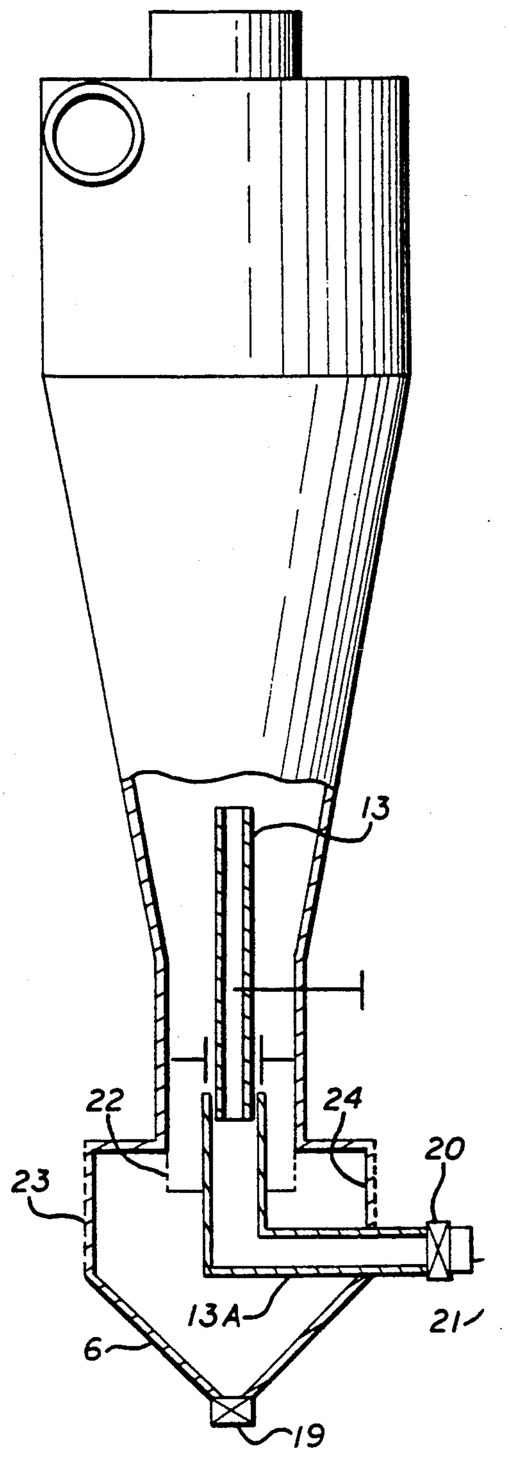
FIG. 4 is a elevational view of a second embodiment of the cyclone dust collector with an artificial air core bed.

In a second embodiment shown in FIG. 4, the air core bed 13 in its lowest part has a lateral position extending laterally through the dust bin 6 to the outer atmosphere. The valve 20 mounted on its exterior end 21 controls the amount of atmospheric air sucked into air core bed 13. The air core bed has two pipe parts telescopically joined. The vertical portion 13 that can be moved up and down is connected to a horizontal one 13*a*, that is attached to a side wall of the dust hopper. To decrease the tangential velocity of the revolving air that leaves the underflow exhaust pipe 14, its lowest segment, dipped into dust hopper 6, is provided as a cylindrical large aperture screen 22. To remove some amount of the air form dust hopper 6, a part of its side wall surface can be made of large aperture screen 23 and covered with a porous fabric 24.

An air core bed unit was built into a 16 inch diameter cyclone dust collector. Tens of tests proved that negative air pressure in the dust bin was totally eliminated, and feed capacity was increased, and that the negative pressure in the dust bin of the vacuum cyclone was greatly reduced, while the separation efficiency was at least maintained at the previous level.

This invention is not to be limited by the embodiments shown in the drawings or described in the description, which is given by way of example and not limitation, but only in accordance with the scope of the appended claims.

I claim:

1. In a method for separating solid particles of foreign matter from a feed gas delivered in fluid flow to a cyclone having walls forming an axially elongated cylindrical-conical separating chamber having a conical bottom portion with a bottom outlet, a dust hopper connected to said bottom outlet of said conical portion, a cylindrical upper portion with an exhaust pipe in communication with the cylindrical upper portion of said separating chamber, and an inlet duct in said cylindrical upper portion for introducing said feed gas into said cylindrical upper portion in a tangential direction in a helical swirling flow pattern so as to establish within the separating chamber counterflowing inner and outer vortexes, causing a lighter portion of said particles in said feed gas to move to the inner vortex and to exit through said exhaust pipe as overflow, and a heavier portion of said particles to move to the outer vortex and to exit through the bottom outlet as underflow, the improvement comprising:

insulating a cyclone air core from neighboring portions of the inner vortex in regions of the inner vortex where separated solid particles can be pulled into the inner vortex, by disposing an air core bed duct having a closed lower end to extend coaxially from said dust hopper into said conical lower portion, to improve separation efficiency and feed capacity as well as to eliminate a negative pressure in the pressure cyclone dust hopper and greatly decrease negative pressure in a vacuum cyclone dust hopper.

2. The method according to claim 1, further comprising the step of causing at least a portion of said feed gas to exit from said walls through said underflow exhaust pipe to eliminate negative pressure in said dust hopper.

3. In a cyclone dust collector apparatus having walls forming an axially elongated cylindrical-conical separating chamber, said chamber having an upper cylindrical portion and a lower conical portion, said lower conical portion having a bottom outlet for an underflow product stream through an underflow exhaust, said upper cylindrical portion having an overflow exhaust pipe having a bottom region, an inlet duct in said cylindrical portion for introducing a feed gas into said cylindrical portion in a tangential direction, said lower conical portion having a dust hopper connected to said bottom outlet, the improvement comprising:

an air core bed duct having a closed lower end extending coaxially from said dust hopper into said conical separating chamber for insulating an air core from neighboring portions of feed gas in an inner vortex of said feed gas in the regions of said inner vortex where solid particles can be pulled into said inner vortex and for causing at least a portion of said feed gas to exit through said underflow product stream, to increase cyclone capacity and separation efficiency.

4. The apparatus of claim 3, further comprising means for decreasing the tangential velocity of revolving air in said underflow product stream.

* * * * *